US012680680B2

(12) United States Patent
Hong et al.

(10) Patent No.: US 12,680,680 B2
(45) Date of Patent: Jul. 14, 2026

(54) DOWNLIGHT WITH SCREW-FREE FIXATION STRUCTURE

(71) Applicant: Xiamen PVTECH Co., Ltd., Xiamen (CN)

(72) Inventors: Haibo Hong, Xiamen (CN); Fuxing Lu, Xiamen (CN); Liangliang Cao, Xiamen (CN); Jinsheng Li, Xiamen (CN)

(73) Assignee: Xiamen PVTECH Co., Ltd., Xiamen (CN)

( * ) Notice: Subject to any disclaimer, the term of this patent is extended or adjusted under 35 U.S.C. 154(b) by 298 days.

(21) Appl. No.: 18/902,992

(22) Filed: Oct. 1, 2024

(65) Prior Publication Data

US 2025/0129920 A1 Apr. 24, 2025

(30) Foreign Application Priority Data

Oct. 19, 2023 (CN) ........................ 202311358786.X
Oct. 19, 2023 (CN) ........................ 202322811459.7

(51) Int. Cl.

| | |
|---|---|
| ***F21V 21/04*** | (2006.01) |
| ***F21S 8/02*** | (2006.01) |
| ***F21V 23/00*** | (2015.01) |
| ***F21V 23/04*** | (2006.01) |
| ***F21Y 105/10*** | (2016.01) |
| ***F21Y 105/12*** | (2016.01) |

(52) U.S. Cl.

CPC ............ *F21V 21/046* (2013.01); *F21S 8/024* (2013.01); *F21S 8/026* (2013.01); *F21V 21/04* (2013.01); *F21V 23/001* (2013.01); *F21V 23/008* (2013.01); *F21V 23/04* (2013.01); *F21Y 2105/10* (2016.08); *F21Y 2105/12* (2016.08)

(58) Field of Classification Search

CPC F21S 8/024; F21S 8/026; F21V 21/04; F21V 21/042; F21V 21/044; F21V 21/046; F21V 23/001; F21V 23/008; F21V 23/04; F21Y 2105/10; F21Y 2105/12

USPC .......................................................... 362/365

See application file for complete search history.

(56) References Cited

U.S. PATENT DOCUMENTS

| | | | | |
|---|---|---|---|---|
| 7,566,154 B2 * | 7/2009 | Gloisten | B60Q 3/47 | 362/240 |
| 8,926,134 B2 * | 1/2015 | Hast | F21V 21/34 | 362/249.02 |
| 2011/0075427 A1 * | 3/2011 | Higuchi | F21S 8/026 | 362/294 |
| 2018/0283678 A1 * | 10/2018 | Qian | F21V 21/02 | |
| 2024/0068654 A1 * | 2/2024 | Hong | F21V 15/01 | |

* cited by examiner

*Primary Examiner* — Laura K Tso
(74) *Attorney, Agent, or Firm* — Winston Hsu

(57) ABSTRACT

A downlight with screw-free fixation structure includes a lamp body and a light source board. The lamp body has a central hole, an inner ring body, and a plurality of protrusions. The inner ring body is disposed on the inner edge of the lamp body to partially cover the central hole. The protrusions are distributed along the inner edge of the lamp body and surrounding the central hole. A plurality of slots are formed respectively between the protrusions and the inner ring body. The light source board is disposed on the inner ring body and within the central hole, and engaged with the multiple slots. The light source board is disc-shaped.

17 Claims, 17 Drawing Sheets

DOWNLIGHT WITH SCREW-FREE FIXATION STRUCTURE

BACKGROUND OF THE INVENTION

1. Field of the Invention

The present invention relates to a downlight, in particular to a downlight with screw-free fixation structure.

2. Description of the Prior Art

Currently available embedded downlights usually use screw locking or riveting to secure the light source board. These fixation methods usually require manual operation, which cannot be automated. These fixation methods not only increase the time and manpower costs in the production process but also incur a higher risk of human error. Additionally, the use of additional fixing components such as screws or rivets increases material costs. Therefore, these fixation methods result in increased production costs, reduced production efficiency, and may affect the overall quality and reliability of the product.

Furthermore, the currently available embedded downlights are installed in openings on the ceiling. However, the ceiling needs to be fixed with beams, hangers, joists, and other structures at the ceiling, causing some openings to potentially conflict with these structures. This situation renders currently available embedded downlights unable to be installed properly.

Moreover, the currently available embedded downlights are mostly of the vertical type, and the dip switch thereof are usually disposed on the driver. Due to the installation position of the driver, users are difficult to find out the dip switches. Thus, the currently available embedded downlights are inconvenient in use and cannot meet actual requirements.

SUMMARY OF THE INVENTION

One embodiment of the present invention provides a downlight with screw-free fixation structure, which includes a lamp body and a light source board. The lamp body has a central hole, an inner ring body, and a plurality of protrusions. The inner ring body is disposed on the inner edge of the lamp body to partially cover the central hole. The protrusions are distributed along the inner edge of the lamp body and surrounding the central hole. A plurality of slots are formed respectively between the protrusions and the inner ring body. The light source board is disposed on the inner ring body and within the central hole, and engaged with the multiple slots. The light source board is disc-shaped.

In one embodiment, the light source board has a plurality of straight sides.

In one embodiment, the number of straight sides is greater than the number of slots.

In one embodiment, the number of straight edges is equal to the number of slots.

In one embodiment, the light source board has a plurality of fixing holes, and one side of the inner ring body is provided with a plurality of locking points corresponding to one side of the light source board. The locking points are inserted into the fixing holes.

In one embodiment, the number of fixing holes is greater than the number of locking points.

In one embodiment, the number of fixing holes is equal to the number of locking points.

In one embodiment, the light source board has a plurality of straight sides, and the number of the straight sides is greater than the number of the fixing holes.

In one embodiment, the inner ring body partially covers the light source board.

In one embodiment, one side of the light source board partially protrudes from the inner ring body.

In one embodiment, the downlight further includes a switch module disposed inside the control box and electrically connected to the light source board.

In one embodiment, the shortest distance from the control box to the central axis of the central hole is greater than half the radius of the central hole.

In one embodiment, a vacant space is formed on one side of the control box.

In one embodiment, the external power source is a utility power or a generator.

In one embodiment, the downlight further includes a light cover disposed on the other side of the lamp body to cover the central hole and the other side of the light source board.

The downlight with screw-free fixation structure in accordance with the embodiments of the present invention may have the following advantages:

(1) In one embodiment of the present invention, the downlight includes a lamp body and a light source board. The lamp body has a central hole, an inner ring body, and a plurality of protrusions. The inner ring body is disposed on the inner edge of the lamp body to partially cover the central hole. The protrusions are distributed along the inner edge of the lamp body and surrounding the central hole. A plurality of slots are formed respectively between the protrusions and the inner ring body. The light source board is disposed on the inner ring body and within the central hole, and engaged with the multiple slots. The light source board is disc-shaped. Via this screw-free fixation structural design, the downlight can securely fasten the light source board via a screw-free fixation mechanism, thereby reducing time and manpower costs in the production process and minimizing the risk of human error. Moreover, this screw-free fixation structural design eliminates the need for additional fixing components, thus reducing material costs. Consequently, the production cost of the downlight can be significantly reduced, and production efficiency enhanced.

(2) In one embodiment of the present invention, the light source board has a plurality of fixing holes, while one side of the light source board corresponding to the light source board is provided with a plurality of locking points. The locking points are inserted into the fixing holes. Via the slots, fixing holes, and locking points, a multifunctional fixing effect can be achieved, which not only achieves a snap-fit effect but also a press-fit effect. Therefore, this screw-free fixation structural design with multifunctional fixation effect can stabilize the light source board more effectively, enhancing the overall structural stability of the downlight.

(3) In one embodiment of the present invention, the downlight further includes a switch module and a control box. The switch module is disposed inside the control box, and the control box does not face the light-emitting surface of the light source board. Therefore, the control box and switch module do not affect the light-emitting effect of the light source board, and the user can conveniently operate the switch module to turn the downlight on or off, or adjust the brightness or color temperature thereof. As a result, the light emitting effect of the downlight can be effectively enhanced, and the downlight can be more convenient in use so as to provide the user with a great user experience.

(4) In one embodiment of the present invention, the light source board is disposed on the inner ring body within the central hole, with the inner ring body partially covering the light source board. Thus, one side of the light source board can partially protrude from the inner ring body, allowing the light source board to dissipate heat through the structure mentioned above, preventing damage due to overheating. This special heat dissipation structure design can effectively extend the service life of the downlight and enhance the reliability thereof.

(5) In one embodiment of the present invention, the shortest distance from the control box to the central axis of the lamp body's central hole is greater than half the radius of the lamp body's central hole. This side-mounted control box design creates a vacant space on one side of the control box. When the downlight is installed on the ceiling, this vacant space can accommodate beams or similar items to avoid interference with the structure of the building. Therefore, the downlight can be applied to various buildings, so the downlight can be more comprehensive in application and more flexible in use.

(6) In one embodiment of the present invention, the ultra-thin structural design of the downlight significantly reduces the thickness thereof, so it is convenient to install the downlight. Thus, the user can more easily install the downlight on various types of ceilings or walls, suitable for various buildings. At the same time, this structural design provides more possibilities for interior design to optimize the overall lighting effect. Therefore, the practicality of the downlight can be greatly enhanced.

Further scope of applicability of the present application will become more apparent from the detailed description given hereinafter. However, it should be understood that the detailed description and specific examples, while indicating exemplary embodiments of the present invention, are given by way of illustration only, since various changes and modifications within the spirit and scope of the present invention will become apparent to those skilled in the art from this detailed description.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The present invention will become more fully understood from the detailed description given herein below and the accompanying drawings which are given by way of illustration only, and thus are not limitative of the present invention and wherein.

DETAILED DESCRIPTION

Figure 1:
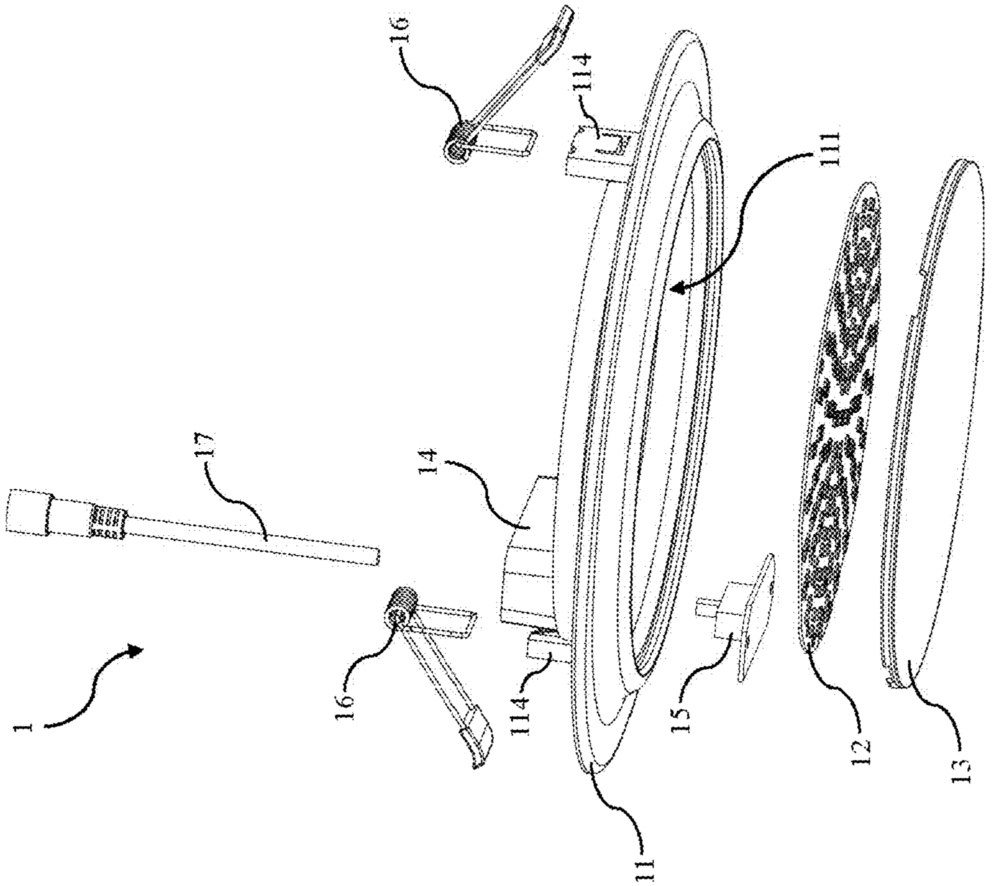
FIG. 1 is an exploded view of a downlight with screw-free fixation structure in accordance with one embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. It should be understood that, when it is described that an element is "coupled" or "connected" to another element, the element may be "directly coupled" or "directly connected" to the other element or "coupled" or "connected" to the other element through a third element. In contrast, it should be understood that, when it is described that an element is "directly coupled" or "directly connected" to another element, there are no intervening elements.

Figure 2:
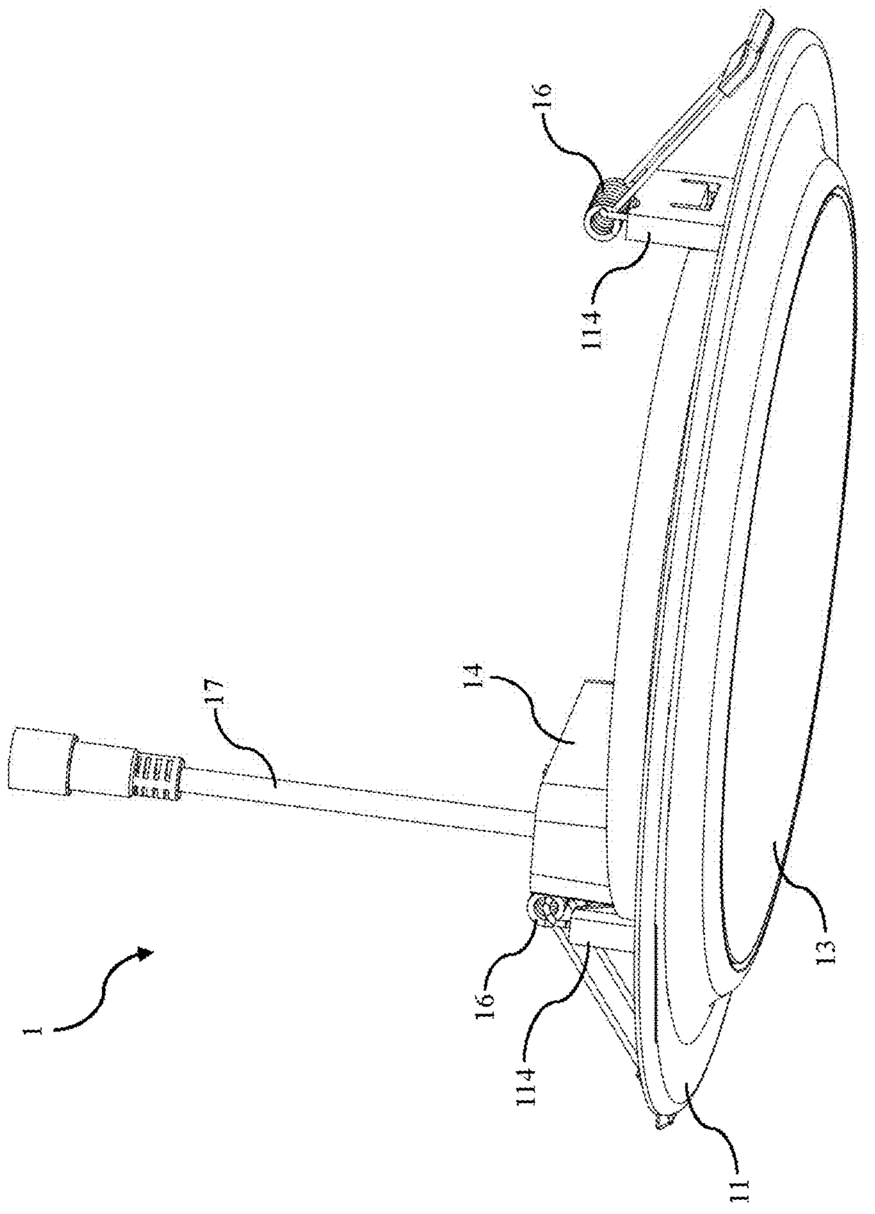
FIG. 2 illustrates a perspective view of the downlight with screw-free fixation structure in accordance with one embodiment of the present invention.
Figure 3:
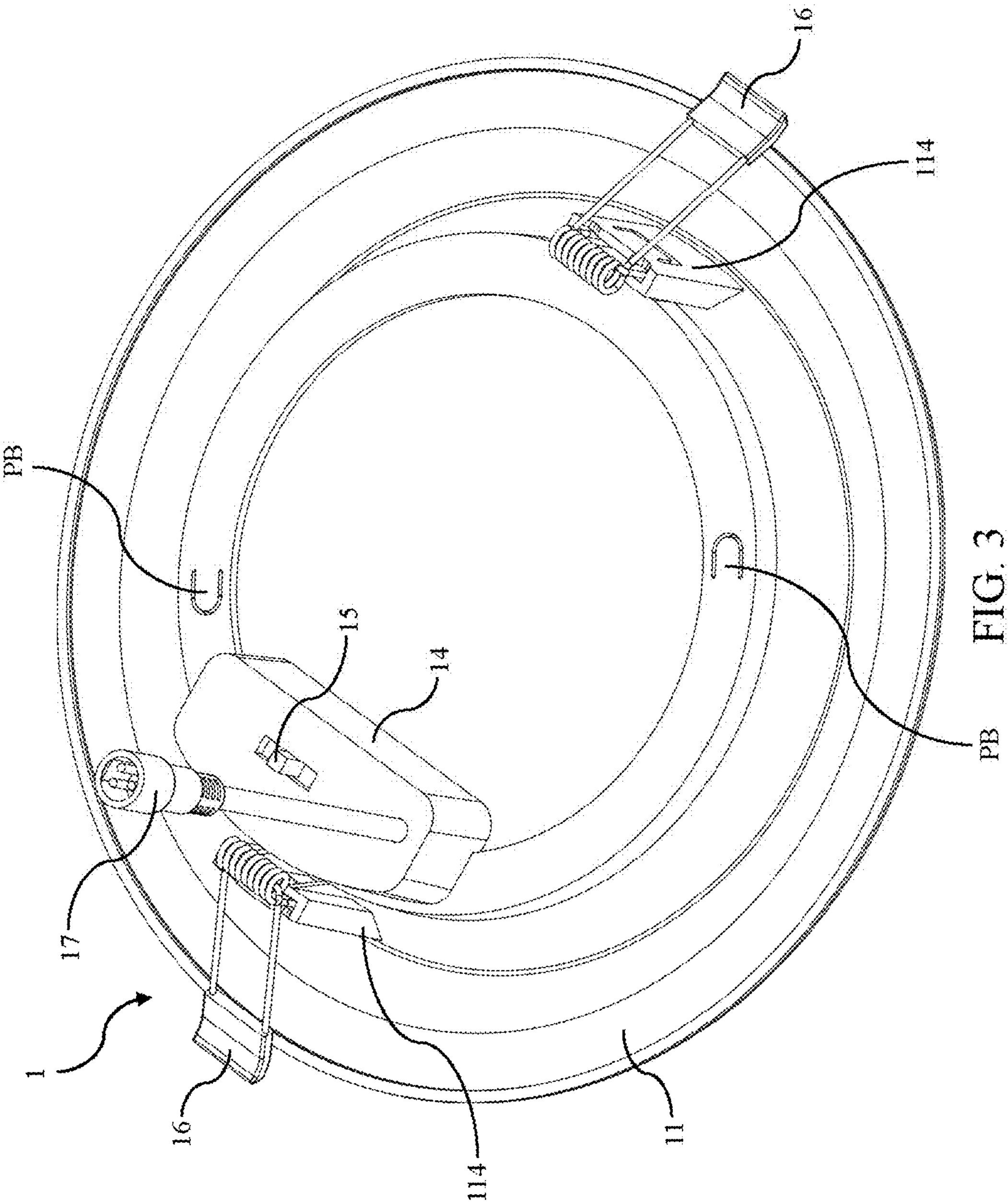
FIG. 3 is a top view of the downlight with screw-free fixation structure in accordance with one embodiment of the present invention.
Figure 4:
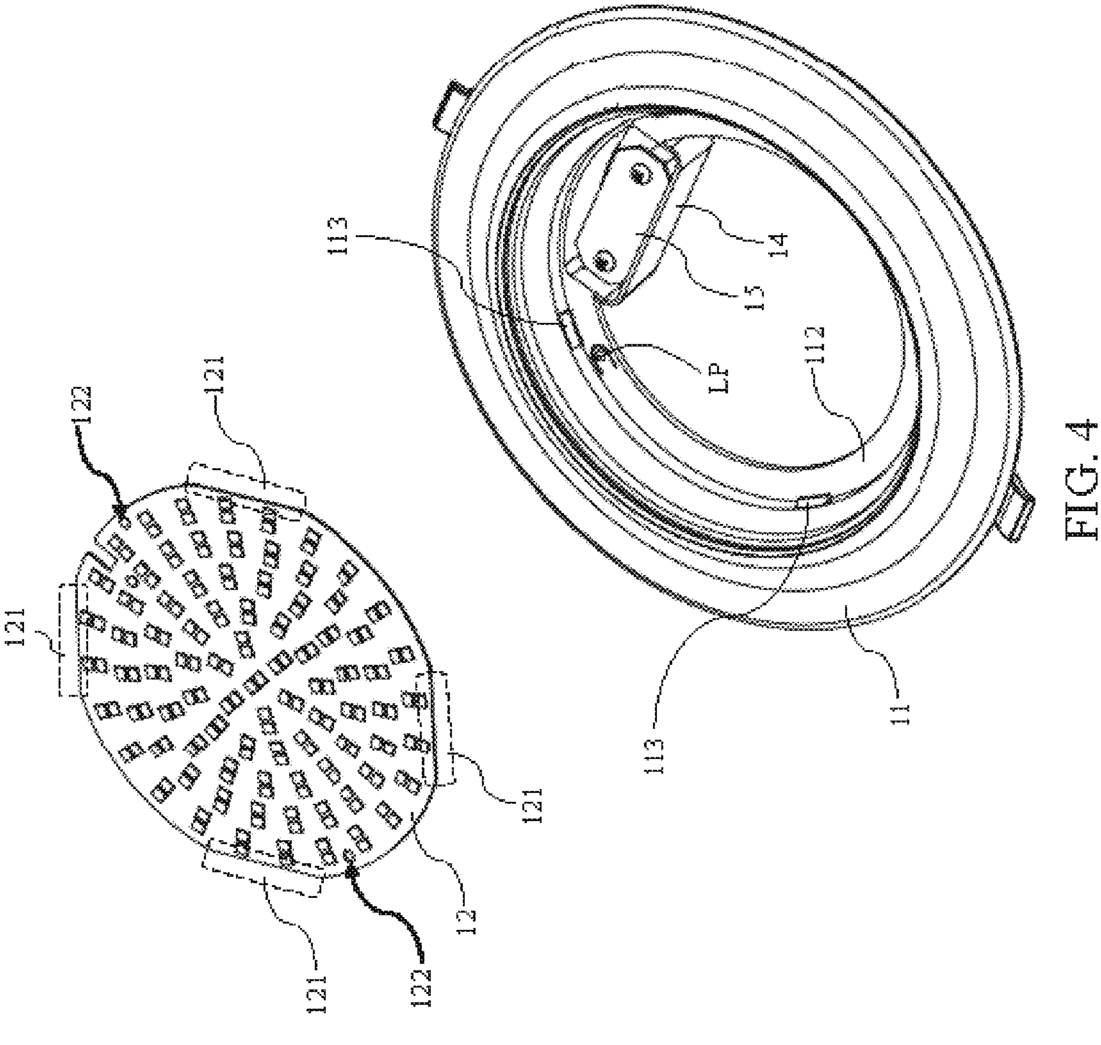
FIG. 4 is a schematic of a light source board and a lamp body of the downlight with screw-free fixation structure in accordance with one embodiment of the present invention.

Please refer to FIG. 1, FIG. 2, FIG. 3 and FIG. 4. FIG. 1 is an exploded view of a downlight with screw-free fixation structure in accordance with one embodiment of the present invention. FIG. 2 illustrates a perspective view of the downlight with screw-free fixation structure in accordance with one embodiment of the present invention. FIG. 3 is a top view of the downlight with screw-free fixation structure in accordance with one embodiment of the present invention. FIG. 4 is a schematic of a light source board and a lamp body of the downlight with screw-free fixation structure in accordance with one embodiment of the present invention. As shown in FIG. 1, FIG. 2, FIG. 3 and FIG. 4, the downlight 1 includes a lamp body 11, a light source board 12, a light cover 13, a control box 14, a switch module 15, two spring latches 16, and a power cable 17.

The lamp body 11 has a central hole 111, an inner ring body 112, four protrusions 113, and two holders 114. In this embodiment, the lamp body 11 can be made of non-metallic materials such as plastic. In another embodiment, the lamp body 11 can also be made of metal materials such as aluminum, copper, stainless steel, etc.

The inner ring body 112 is disposed on the inner edge of the lamp body 11 and partially covers the central hole 111. In this embodiment, the inner ring body 112 has a notch to accommodate the control box 14. One side of the inner ring body 112 has a plurality of locking points LP. In another embodiment, the inner ring body 112 can be a complete ring, and the control box 14 is disposed on the inner ring body 112.

The four protrusions 113 are distributed on the inner edge of the lamp body 11 and surround the central hole 111. The four protrusions 113 and the inner ring body 112 respectively form four slots. The number of protrusions 113 and slots can be adjusted according to actual needs.

The light source board 12 is disc-shaped. The light source board 12 is disposed on the inner ring body 112 and inside the central hole 111, and is mutually engaged with the four slots. The inner ring body 112 partially covers the light source board 12, such that one side of the light source board 12 is partially exposed from the inner ring body 112. The light source board 12 may have four straight sides 121 and two fixing holes 122. The two locking points LP are disposed on one side, corresponding to the light source board 12, of the inner ring body 112, and the two locking points LP are respectively inserted into the two fixing holes 122. In this embodiment, the number of straight sides 121 is equal to the number of slots. In another embodiment, the number of straight sides 121 is greater than the number of slots. In this embodiment, the number of fixing holes 122 is equal to the number of locking points LP. In another embodiment, the number of fixing holes 122 is greater than the number of locking points LP. The number of the above components can be adjusted according to actual needs.

The control box 14 is disposed on one side of the lamp body 11, and the switch module 15 is disposed inside the control box 14 and electrically connected to the light source board 12. The control box 14 also includes a power module and other necessary functional modules (not shown in the drawings), which are also electrically connected to the light source board 12. The switch module 15 can be used to turn the downlight 1 on or off, or adjust the brightness or color temperature of the downlight 1. In this embodiment, the switch module 15 can be a dip switch. In another embodiment, the switch module 15 can be a button, knob, or other similar component.

One end of the power cable 17 is connected to the control box 14, and the other end of the power cable 17 is connected to an external power source (such as mains electricity, generator, etc.).

The two holders 114 are disposed on one side of the lamp body 11, and two spring buckles 16 are respectively fixed on the two holders 114.

The light cover 13 is disposed on the other side of the lamp body 11 and covers the central hole 111 and the other side of the light source board 12. In one embodiment, the light cover 13 can be made of transparent or translucent materials, such as plastic, glass, etc.

As previous stated, the downlight 1 has a screw-free fixation structural design, so the light source board 12 can be fixed by a screw-free fixing mechanism, which can reduce the time and manpower costs in the production process and reduce the risk of human error. Furthermore, the screw-free fixation structural design does not require additional fixing components, thereby reducing material costs. Therefore, the production cost of the downlight 1 can be greatly reduced, and the production efficiency can be effectively improved.

In addition, through the above structure design, the control box 14 does not face the light-emitting surface of the light source board 12. Therefore, the control box 14 and the switch module 15 do not affect the light-emitting effect of the light source board 12, and the user can conveniently operate the switch module 15 to turn the downlight 1 on or off, or adjust the brightness or color temperature of the downlight 1. Therefore, the light-emitting effect of the downlight 1 can be effectively improved, so the downlight 1 can be more convenient in use in order to provide the user with a great user experience.

The embodiment just exemplifies the present invention and is not intended to limit the scope of the present invention; any equivalent modification and variation according to the spirit of the present invention is to be also included within the scope of the following claims and their equivalents.

Figure 5:
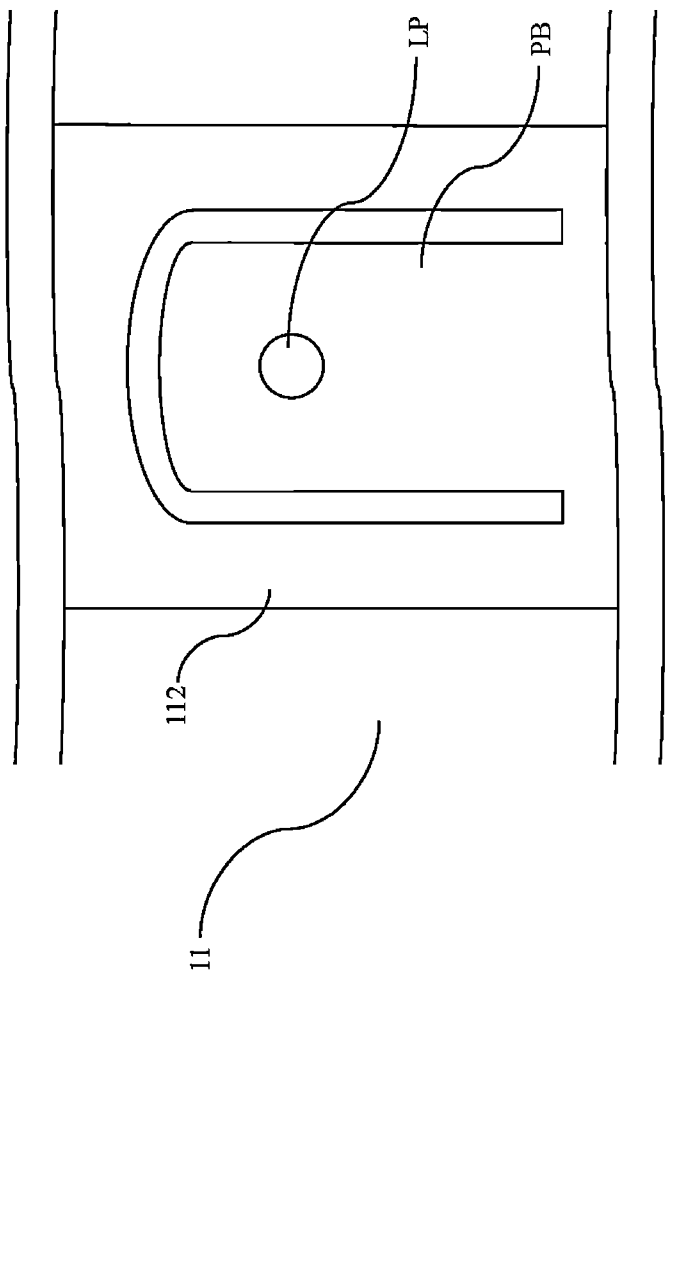
FIG. 5 is a partial enlarged view of an inner ring body of the downlight with screw-free fixation structure in accordance with one embodiment of the present invention.

Please refer to FIG. 5, which is a partial enlarged view of an inner ring body of the downlight with screw-free fixation structure in accordance with one embodiment of the present invention. As shown in FIG. 5, the inner ring body 112 has two plate bodies PB, and the two locking points LP are respectively disposed on the two plate bodies PB.

The embodiment just exemplifies the present invention and is not intended to limit the scope of the present invention; any equivalent modification and variation according to the spirit of the present invention is to be also included within the scope of the following claims and their equivalents.

Figure 6:
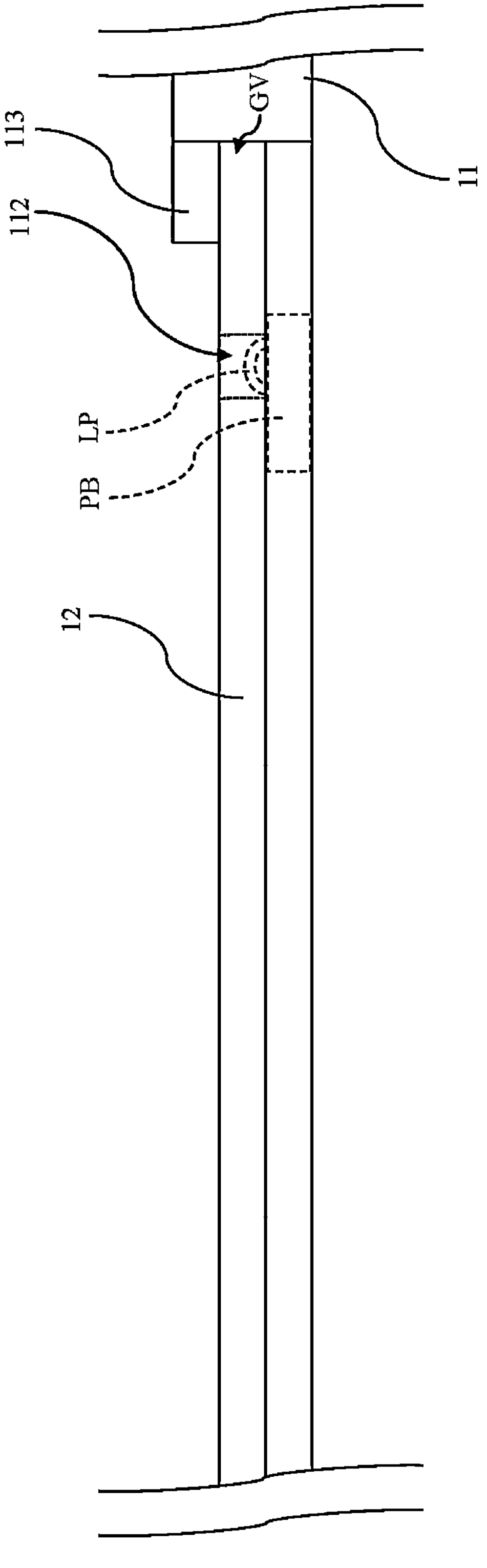
FIG. 6 is a schematic view of an assembling process of the downlight with screw-free fixation structure in accordance with one embodiment of the present invention.

Please refer to FIG. 6, which is a schematic view of an assembling process of the downlight with screw-free fixation structure in accordance with one embodiment of the present invention. As shown in FIG. 6, the user can align the four straight sides 121 of the light source board 12 with the four protrusions 113 on the inner edge of the lamp body 11 and place the light source board 12 on the inner ring body 112. Then, the user can apply pressure towards the inner ring body 112 to press the light source board 12 to make the light source board 12 press the two locking points LP on the two plate bodies PB of the inner ring body 112. At this point, the two plate bodies PB pressed by the light source board 12 can provide resilience, causing the two locking points LP to be in an interference fit with the light source board 12. Subsequently, the user can rotate the light source board 12 to make the four slots GV of the lamp body 11 be engaged with the light source board 12. Finally, the user can stop rotating the light source board 12 when the two locking points LP are respectively inserted into the two fixing holes 112 of the light source board 12, and the structural strength of the plate bodies PB prevents the two locking points LP from disengaging from the two fixing holes 112 of the light source board 12. Consequently, the light source board 12 is engaged with the four slots GV of the lamp body 11, and the two locking points LP are respectively inserted into the two fixing holes 112 of the light source board 12.

Through the slots GV, fixing holes 112, and locking points LP described above, a multifunctional fixing effect can be achieved, which not only achieves a snap-fit effect but also a press-fit effect. Therefore, the screw-free fixation structural design with multifunctional fixing effect described above can more stably fix the light source board 12, thereby enhancing the overall structural stability of the downlight 1.

The embodiment just exemplifies the present invention and is not intended to limit the scope of the present invention; any equivalent modification and variation according to the spirit of the present invention is to be also included within the scope of the following claims and their equivalents.

It is worthy to point out that currently available embedded downlights usually use screw locking or riveting to secure the light source board. These fixation methods usually require manual operation, which cannot be automated. These fixation methods not only increase the time and manpower costs in the production process but also incur a higher risk of human error. Additionally, the use of additional fixing components such as screws or rivets increases material costs. Therefore, these fixation methods result in increased production costs, reduced production efficiency, and may affect the overall quality and reliability of the product. Furthermore, the currently available embedded downlights are installed in openings on the ceiling. However, the ceiling needs to be fixed with beams, hangers, joists, and other structures at the ceiling, causing some openings to potentially conflict with these structures. This situation renders currently available embedded downlights unable to be installed properly. Moreover, the currently available embedded downlights are mostly of the vertical type, and the dip switch thereof are usually disposed on the driver. Due to the installation position of the driver, users are difficult to find out the dip switches. Thus, the currently available embedded downlights are inconvenient in use and cannot meet actual requirements. By contrast, according to one embodiment of the present invention, the downlight includes a lamp body and a light source board. The lamp body has a central hole, an inner ring body, and a plurality of protrusions. The inner ring body is disposed on the inner edge of the lamp body to partially cover the central hole. The protrusions are distributed along the inner edge of the lamp body and surrounding the central hole. A plurality of slots are formed respectively between the protrusions and the inner ring body. The light source board is disposed on the inner ring body and within the central hole, and engaged with the multiple slots. The light source board is disc-shaped. Via this screw-free fixation structural design, the downlight can securely fasten the light source board via a screw-free fixation mechanism, thereby reducing time and manpower costs in the production process and minimizing the risk of human error. Moreover, this screw-free fixation structural design eliminates the need for additional fixing components, thus reducing material costs. Consequently, the production cost of the downlight can be significantly reduced, and production efficiency enhanced.

According to one embodiment of the present invention, the light source board has a plurality of fixing holes, while one side of the light source board corresponding to the light source board is provided with a plurality of locking points. The locking points are inserted into the fixing holes. Via the slots, fixing holes, and locking points, a multifunctional fixing effect can be achieved, which not only achieves a snap-fit effect but also a press-fit effect. Therefore, this screw-free fixation structural design with multifunctional fixation effect can stabilize the light source board more effectively, enhancing the overall structural stability of the downlight.

Further, according to one embodiment of the present invention, the downlight further includes a switch module and a control box. The switch module is disposed inside the control box, and the control box does not face the light-emitting surface of the light source board. Therefore, the control box and switch module do not affect the light-emitting effect of the light source board, and the user can conveniently operate the switch module to turn the downlight on or off, or adjust the brightness or color temperature thereof. As a result, the light emitting effect of the downlight can be effectively enhanced, and the downlight can be more convenient in use so as to provide the user with a great user experience.

Moreover, according to one embodiment of the present invention, the light source board is disposed on the inner ring body within the central hole, with the inner ring body partially covering the light source board. Thus, one side of the light source board can partially protrude from the inner ring body, allowing the light source board to dissipate heat through the structure mentioned above, preventing damage due to overheating. This special heat dissipation structure design can effectively extend the service life of the downlight and enhance the reliability thereof.

Furthermore, according to one embodiment of the present invention, the ultra-thin structural design of the downlight significantly reduces the thickness thereof, so it is convenient to install the downlight. Thus, the user can more easily install the downlight on various types of ceilings or walls, suitable for various buildings. At the same time, this structural design provides more possibilities for interior design to optimize the overall lighting effect. Therefore, the practicality of the downlight can be greatly enhanced. As set forth above, the downlight with screw-free fixation structure according to the embodiments can definitely achieve great technical effects.

Figure 7:
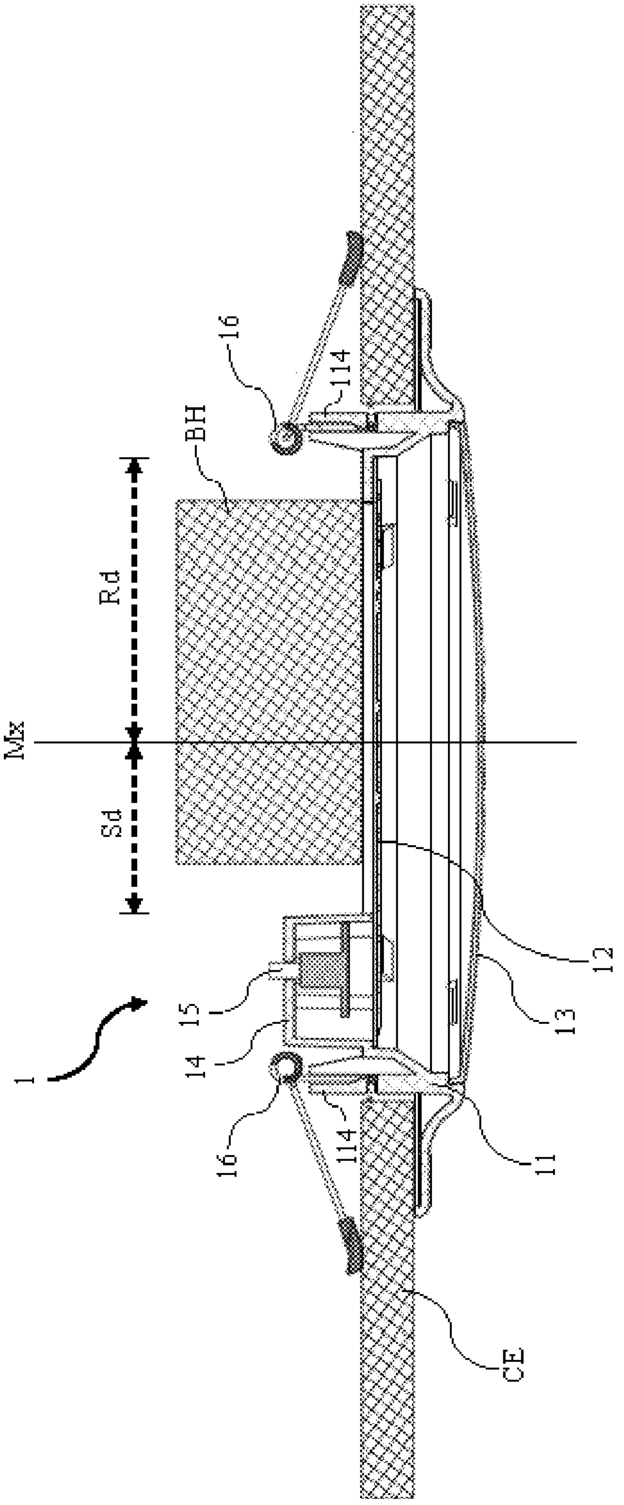
FIG. 7 is a schematic view of installing the downlight with screw-free fixation structure in accordance with another embodiment of the present invention.

Please refer to FIG. 7, which is a schematic view of installing the downlight with screw-free fixation structure in accordance with another embodiment of the present invention. Please also refer to FIG. 1, FIG. 2, FIG. 3 and FIG. 4. As shown in FIG. 1, FIG. 2, FIG. 3 and FIG. 4, the downlight 1 includes a lamp body 11, a light source board 12, a light cover 13, a control box 14, a switch module 15, two spring latches 16, and a power cable 17.

The lamp body 11 has a central hole 111, an inner ring body 112, four protrusions 113, and two holders 114.

The inner ring body 112 is disposed on the inner edge of the lamp body 11 and partially covers the central hole 111. One side of the inner ring body 112 has a plurality of locking points LP.

The four protrusions 113 are distributed on the inner edge of the lamp body 11 and surround the central hole 111. The four protrusions 113 and the inner ring body 112 respectively form four slots.

The light source board 12 is disc-shaped. The light source board 12 is disposed on the inner ring body 112 and inside the central hole 111, and is mutually engaged with the four slots. The inner ring body 112 partially covers the light source board 12, such that one side of the light source board 12 is partially exposed from the inner ring body 112. The light source board 12 may have four straight sides 121 and two fixing holes 122. The two locking points LP are disposed on one side, corresponding to the light source board 12, of the inner ring body 112, and the two locking points LP are respectively inserted into the two fixing holes 122.

The control box 14 is disposed on one side of the lamp body 11, and the switch module 15 is disposed inside the control box 14 and electrically connected to the light source board 12. The control box 14 also includes a power module and other necessary functional modules (not shown in the drawings), which are also electrically connected to the light source board 12. The switch module 15 can be used to turn the downlight 1 on or off, or adjust the brightness or color temperature of the downlight 1. In this embodiment, the switch module 15 can be a dip switch.

One end of the power cable 17 is connected to the control box 14, and the other end of the power cable 17 is connected to an external power source (such as mains electricity, generator, etc.).

The two holders 114 are disposed on one side of the lamp body 11, and two spring buckles 16 are respectively fixed on the two holders 114.

The light cover 13 is disposed on the other side of the lamp body 11 and covers the central hole 111 and the other side of the light source board 12. In one embodiment, the light cover 13 can be made of transparent or translucent materials, such as plastic, glass, etc.

Similarly, as described above, the downlight 1 has a screw-free fixation structural design, so the light source board 12 can be fixed by a screw-free fixing mechanism, which can reduce the time and manpower costs in the production process and reduce the risk of human error. Furthermore, the screw-free fixation structural design does not require additional fixing components, thereby reducing material costs. Therefore, the production cost of the downlight 1 can be greatly reduced, and the production efficiency can be effectively improved.

Besides, via the above structure design, the control box 14 does not face the light-emitting surface of the light source board 12. Therefore, the control box 14 and the switch module 15 do not affect the light-emitting effect of the light source board 12, and the user can conveniently operate the switch module 15 to turn the downlight 1 on or off, or adjust the brightness or color temperature of the downlight 1. Therefore, the light-emitting effect of the downlight 1 can be effectively improved, so the downlight 1 can be more convenient in use in order to provide the user with a great user experience.

As shown in FIG. 5, the inner ring body 112 has two plate bodies PB, and the two locking points LP are respectively disposed on the two plate bodies PB.

As shown in FIG. 6, the user can align the four straight sides 121 of the light source board 12 with the four protrusions 113 on the inner edge of the lamp body 11 and place the light source board 12 on the inner ring body 112. Then, the user can apply pressure towards the inner ring body 112 to press the light source board 12 to make the light source board 12 press the two locking points LP on the two plate bodies PB of the inner ring body 112. At this point, the two plate bodies PB pressed by the light source board 12 can provide resilience, causing the two locking points LP to be in an interference fit with the light source board 12. Subsequently, the user can rotate the light source board 12 to make the four slots GV of the lamp body 11 be engaged with the light source board 12. Finally, the user can stop rotating the light source board 12 when the two locking points LP are respectively inserted into the two fixing holes 112 of the light source board 12, and the structural strength of the plate bodies PB prevents the two locking points LP from disengaging from the two fixing holes 112 of the light source board 12. Consequently, the light source board 12 is engaged with the four slots GV of the lamp body 11, and the two locking points LP are respectively inserted into the two fixing holes 112 of the light source board 12.

Through the slots GV, fixing holes 112, and locking points LP described above, a multifunctional fixing effect can be achieved, which not only achieves a snap-fit effect but also a press-fit effect. Therefore, the screw-free fixation structural design with multifunctional fixing effect described above can more stably fix the light source board 12, thereby enhancing the overall structural stability of the downlight 1.

As shown in FIG. 7, when the downlight 1 is installed on the ceiling CE, the two spring buckles 16 can secure the downlight 1 to the ceiling CE.

Additionally, the distance Sd between the control box 14 and the central axis Mx of the central hole 111 of the lamp body 11 is greater than half the radius Rd of the central hole 111 of the lamp body 11. The side-mounted control box design creates a vacant space on one side of the control box 14. Consequently, when the downlight 1 is installed on the ceiling CE, the vacant space can be used to accommodate the beam BH or similar items, thereby avoiding the influence of the building structure on the installation of the downlight 1. Therefore, the downlight 1 can be applied to various buildings, making its application more extensive and flexible.

Similarly, with the aforementioned screw-free fixation structural design, the downlight 1 can secure the light source board 12 through a screw-free fixation mechanism, reducing time and manpower costs during production, and minimizing the risk of human error. Moreover, the screw-free fixation structural design does not require additional fixing components, thereby reducing material costs. Consequently, the production cost of the downlight 1 can be significantly reduced, and production efficiency enhanced.

Furthermore, as mentioned earlier, the light source board 12 has the fixing holes 122, while one side, corresponding to the light source board 12, of the inner ring body 112 is provided with the locking points LP, with each locking point LP inserted into each fixing hole 122. Through the slots GV, fixing holes 122, and locking points LP, a multifunctional fixing effect can be achieved, not only achieving a snap-fit effect but also a press-fit effect. Therefore, the screw-free fixation structural design with multifunctional fixing effect can more stably secure the light source board 12, enhancing the overall structural stability of the downlight 1.

As mentioned previously, the downlight 1 also includes a switch module 15 and a control box 14, with the switch module 15 set inside the control box 14, and the control box 14 not facing the light-emitting surface of the light source board 12. Consequently, the control box 14 and the switch module 15 do not affect the light-emitting effect of the light source board 12, and users can conveniently operate the switch module 15 to turn the downlight 1 on or off, or adjust the brightness or color temperature thereof. Thus, the light-emitting effect of the downlight 1 can be effectively enhanced, and the downlight 1 can be more convenient in use with a view to providing the user with a great user experience.

Similarly, the light source board 12 is disposed on the inner ring body 112 and inside the central hole 111, with the inner ring body 112 partially covering the light source board 12. Consequently, one side of the light source board 12 can be partially exposed from the inner ring body 112, allowing the light source board 12 to dissipate heat through the structure mentioned above, preventing damage due to overheating. This special heat dissipation structural design can effectively extend the service life of the downlight 1 in order to improve the reliability of the downlight 1.

The embodiment just exemplifies the present invention and is not intended to limit the scope of the present invention; any equivalent modification and variation according to the spirit of the present invention is to be also included within the scope of the following claims and their equivalents.

The present invention also provides downlight 1 with side-mounted control box, which includes a lamp body 11, a light source board 12, and a control box 14. The lamp body 11 has a central hole 111 and an inner ring body 112. The inner ring body 112 is disposed on the inner edge of the lamp body 11 and partially covers the central hole 111. The light source board 12 is disposed on the inner ring body 112 and inside the central hole 111. The light source board 12 is disc-shaped. The control box 14 is disposed on one side of the lamp body 11. The shortest distance from the control box 14 to the central axis Mx of the central hole 111 is greater than half the radius of the central hole 111.

In one embodiment, the downlight 1 further includes a power cable 17. The control box 14 is connected to an external power source via the power cable 17.

In one embodiment, the downlight 1 also includes a switch module 15. The switch module 15 is disposed inside the control box 14 and electrically connected to the light source board 12.

In one embodiment, the lamp body 11 also includes a plurality of protrusions 113. The protrusions 113 are distributed on the inner edge of the lamp body 11 and surround the central hole 111. The protrusions 113 and the inner ring body 112 form a plurality of slots GV, with the light source board 12 being engaged with the slots GV.

In one embodiment, the light source board 12 has a plurality of straight sides 121.

In one embodiment, the number of the straight sides 121 is greater than or equal to the number of the slots GV.

In one embodiment, the light source board 12 has a plurality of fixing holes 122. One side, corresponding to the light source board 12, of the inner ring body 112 is provided with a plurality of locking points LP. The locking points LP are inserted into the fixing holes 122 respectively.

In one embodiment, the number of the fixing holes 122 is greater than or equal to the number of the locking points LP.

In one embodiment, the inner ring body 112 partially covers the light source board 12, allowing one side of the light source board 12 to be partially exposed from the inner ring body 112.

In one embodiment, the downlight 1 further includes a light cover 13. The light cover 13 is disposed on the other side of the lamp body 11, covering the central hole 111 and the other side of the light source board 12.

The embodiment just exemplifies the present invention and is not intended to limit the scope of the present invention; any equivalent modification and variation according to the spirit of the present invention is to be also included within the scope of the following claims and their equivalents.

Figure 8:
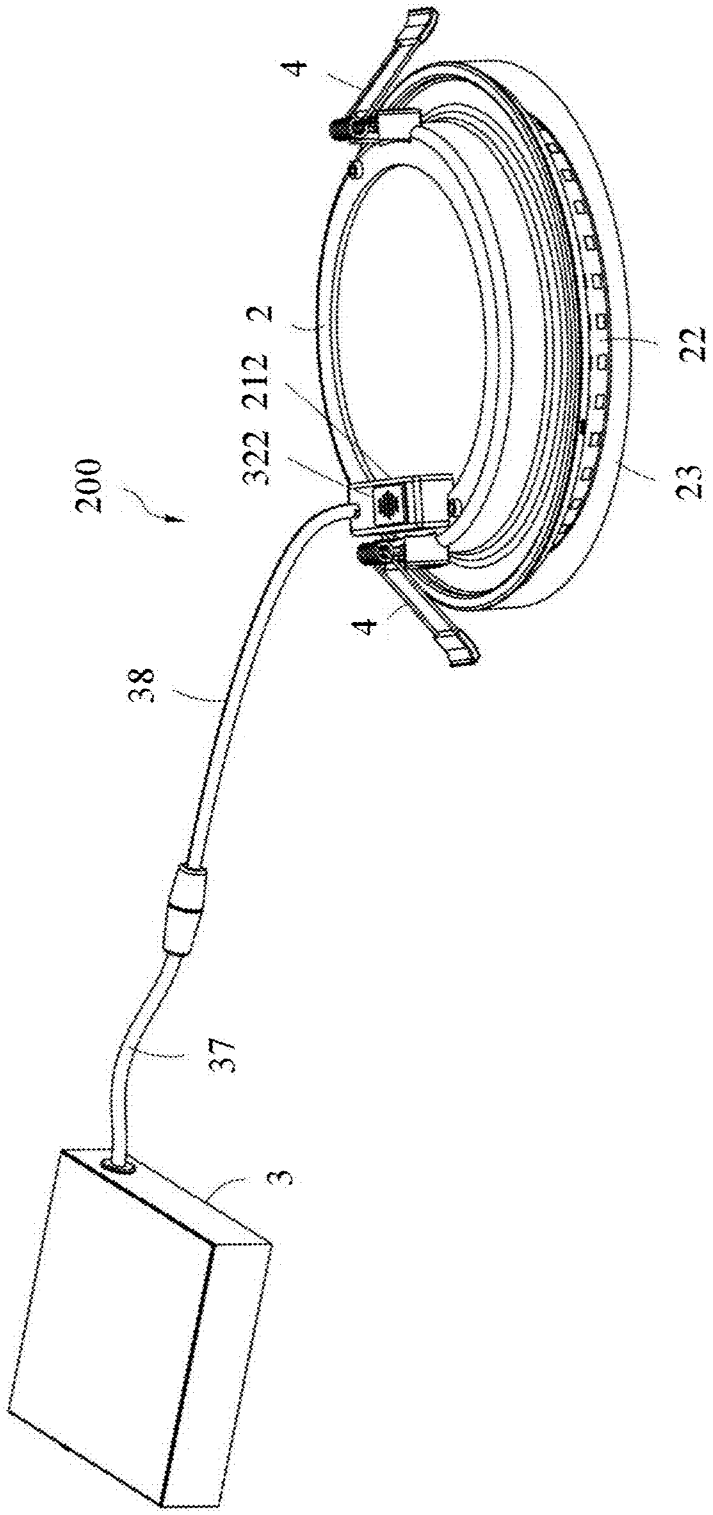
FIG. 8 is a perspective view of a downlight with multi-mode switching function in accordance with yet another embodiment of the present invention.

Please refer to FIG. 8. FIG. 8 is a perspective view of a downlight with multi-mode switching function in accordance with yet another embodiment of the present invention. The downlight 200 with multi-mode switching function includes a housing 2, a lighting-emitting element 22, a lampshade 23, a driver element 3, and a plurality of spring buckle elements 4.

The embodiment just exemplifies the present invention and is not intended to limit the scope of the present invention; any equivalent modification and variation according to the spirit of the present invention is to be also included within the scope of the following claims and their equivalents.

Figure 9:
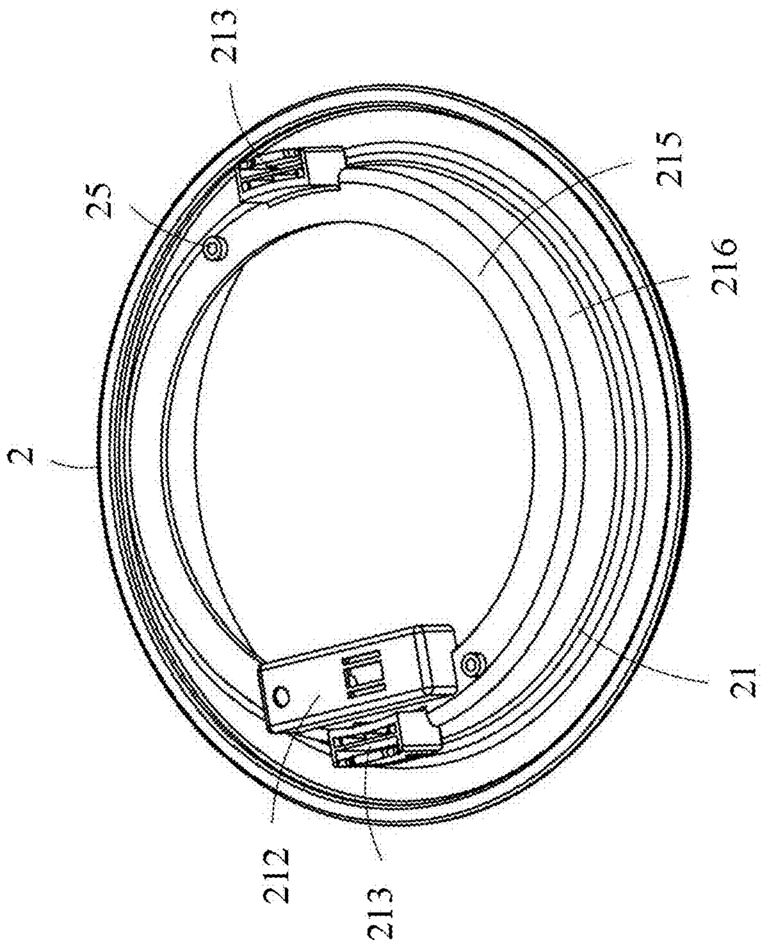
FIG. 9 is a top view of the downlight with multi-mode switching function in accordance with yet another embodiment of the present invention.
Figure 10:
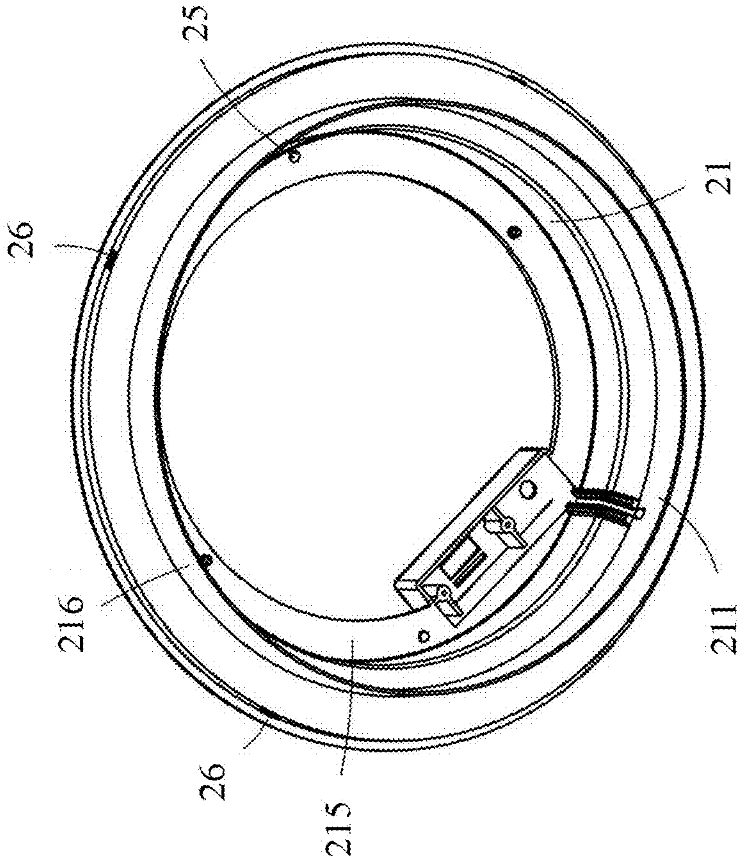
FIG. 10 is a bottom view of the downlight with multi-mode switching function in accordance with yet another embodiment of the present invention (the light-emitting element has not been installed).

Please refer to FIG. 8, FIG. 9, and FIG. 10. FIG. 9 is a top view of the downlight with multi-mode switching function in accordance with yet another embodiment of the present invention. FIG. 10 is a bottom view of the downlight with multi-mode switching function in accordance with yet another embodiment of the present invention (the light-emitting element has not been installed). In some embodiments, the housing 2 has a flat circular structure with a cylindrical body 21, an opening 211, a protection body 212, and a plurality of fixing portions 213. The opening 211 is disposed at one end of the cylindrical body 21, and the protection body 212 and fixing portions 213 are disposed on the outer wall of the cylindrical body 21. The protection body 212 is a rectangular box body with an interior chamber.

The embodiment just exemplifies the present invention and is not intended to limit the scope of the present invention; any equivalent modification and variation according to the spirit of the present invention is to be also included within the scope of the following claims and their equivalents.

Figure 11:
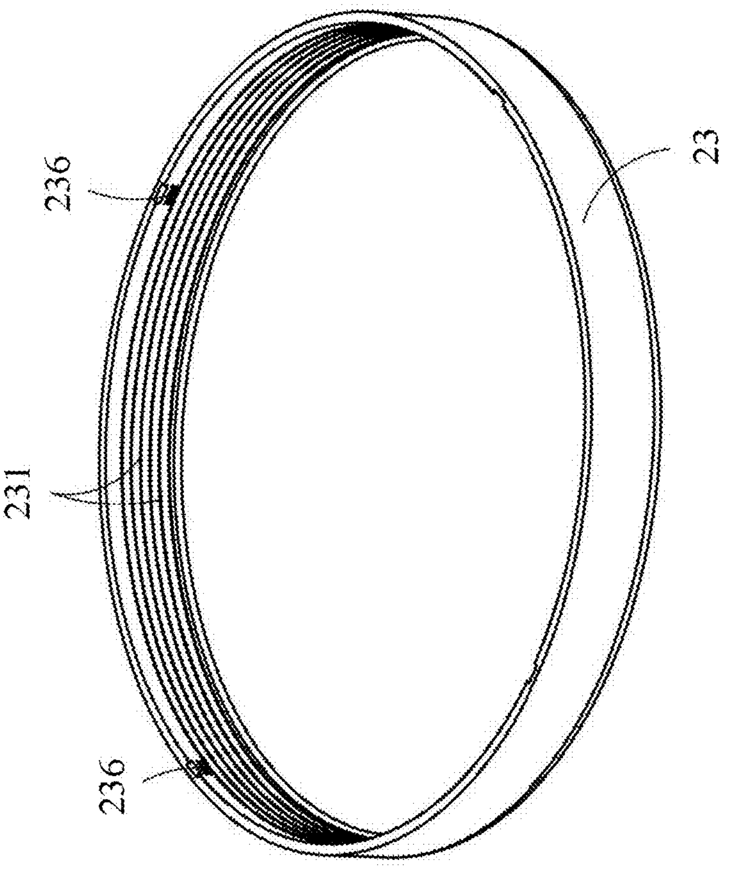
FIG. 11 is a schematic view of a light cover of the downlight with multi-mode switching function in accordance with yet another embodiment of the present invention.
Figure 12:
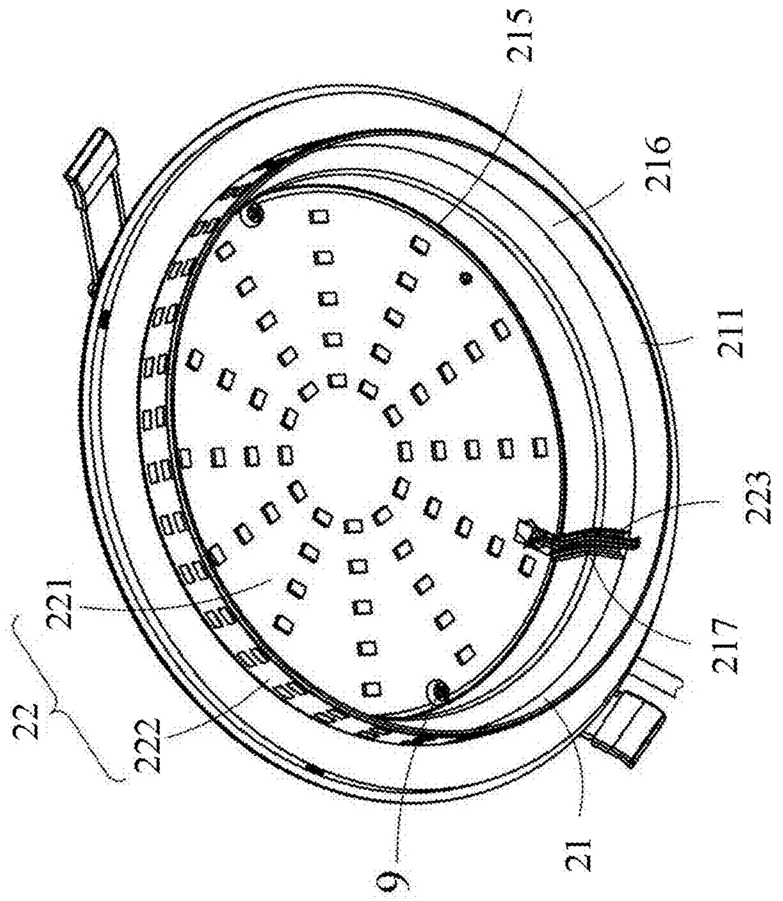
FIG. 12 is a schematic view of a housing of the downlight with multi-mode switching function in accordance with yet another embodiment of the present invention (the light-emitting element has been installed).

Please refer to FIG. 8, FIG. 11, and FIG. 12. FIG. 11 is a schematic view of a light cover of the downlight with multi-mode switching function in accordance with yet another embodiment of the present invention. FIG. 12 is a schematic view of a housing of the downlight with multi-mode switching function in accordance with yet another embodiment of the present invention (the light-emitting element has been installed). In some embodiments, the lighting-emitting element 22 is combined with the cylindrical body 21. The lampshade 23 is combined with the cylindrical body 21 and covers the opening 211. In some embodiments, the side wall of the lampshade 23 has a plurality of stepped patterns 231, which provide a wide-angle lighting effect, creating concentric halos when emitting light from the side, enhancing aesthetics.

Please refer to FIGS. 8, 10, and 11. In some embodiments, the side wall 216 of the lampshade 23 has a plurality of buckle portions 236, and the housing 2 has a plurality of buckle parts 26. When the lampshade 23 is installed on the housing, each buckle portion 236 is respectively engaged with each buckle part 26, assembling and fixing the lampshade 23 to the housing 2 through a buckle mechanism.

The embodiment just exemplifies the present invention and is not intended to limit the scope of the present invention; any equivalent modification and variation according to the spirit of the present invention is to be also included within the scope of the following claims and their equivalents.

Please refer to FIG. 9, FIG. 11, and FIG. 12. In some embodiments, the housing 2 has a plurality of locking holes 25, and the lighting-emitting element 22 is disposed inside the cylindrical body 21, with the locking elements 9 respectively combined with the lighting-emitting element 22 and locked into the locking holes 25.

The embodiment just exemplifies the present invention and is not intended to limit the scope of the present invention; any equivalent modification and variation according to the spirit of the present invention is to be also included within the scope of the following claims and their equivalents.

Please refer to FIG. 9, FIG. 10, and FIG. 12. In some embodiments, the cylindrical body 21 includes a top wall 215 and side wall 216. The lighting-emitting element 22 includes a vertical-type light source element 221 combined with the top wall 215 and a side-type light source element 222 combined with the side wall 216. The cylindrical body 21 has a rib channel 217 on the side wall 216, and the lighting-emitting element 22 includes an electrical wire 223 running through the rib channel 217, connecting the vertical-type light source element 221 and the side-type light source element 222. The vertical-type light source element 221 is fixed using screws or clips and offers multiple color temperature modes, while the side-type light source element 222 is fixed to the side wall 216 using adhesive.

The embodiment just exemplifies the present invention and is not intended to limit the scope of the present invention; any equivalent modification and variation according to the spirit of the present invention is to be also included within the scope of the following claims and their equivalents.

Figure 13:
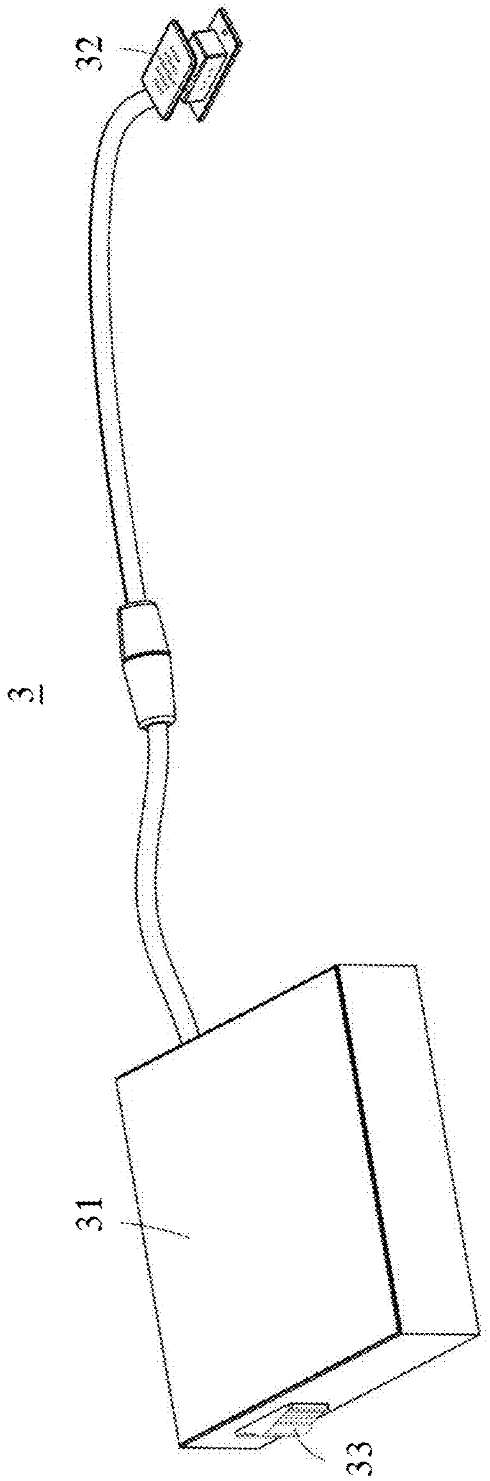
FIG. 13 is a schematic view of a driver element of the downlight with multi-mode switching function in accordance with yet another embodiment of the present invention.

Please refer to FIG. 8, FIG. 12, and FIG. 13. FIG. 13 is a schematic view of a driver element of the downlight with multi-mode switching function in accordance with yet another embodiment of the present invention. In some embodiments, the driver element 3 includes a power box element 31 and a dip switch element 32 connected to the power box element 31, with the dip switch element 32 located within the protection body 312 and connected to the lighting-emitting element 22 (the vertical-type light source element 221).

The embodiment just exemplifies the present invention and is not intended to limit the scope of the present invention; any equivalent modification and variation according to the spirit of the present invention is to be also included within the scope of the following claims and their equivalents.

Figure 14:
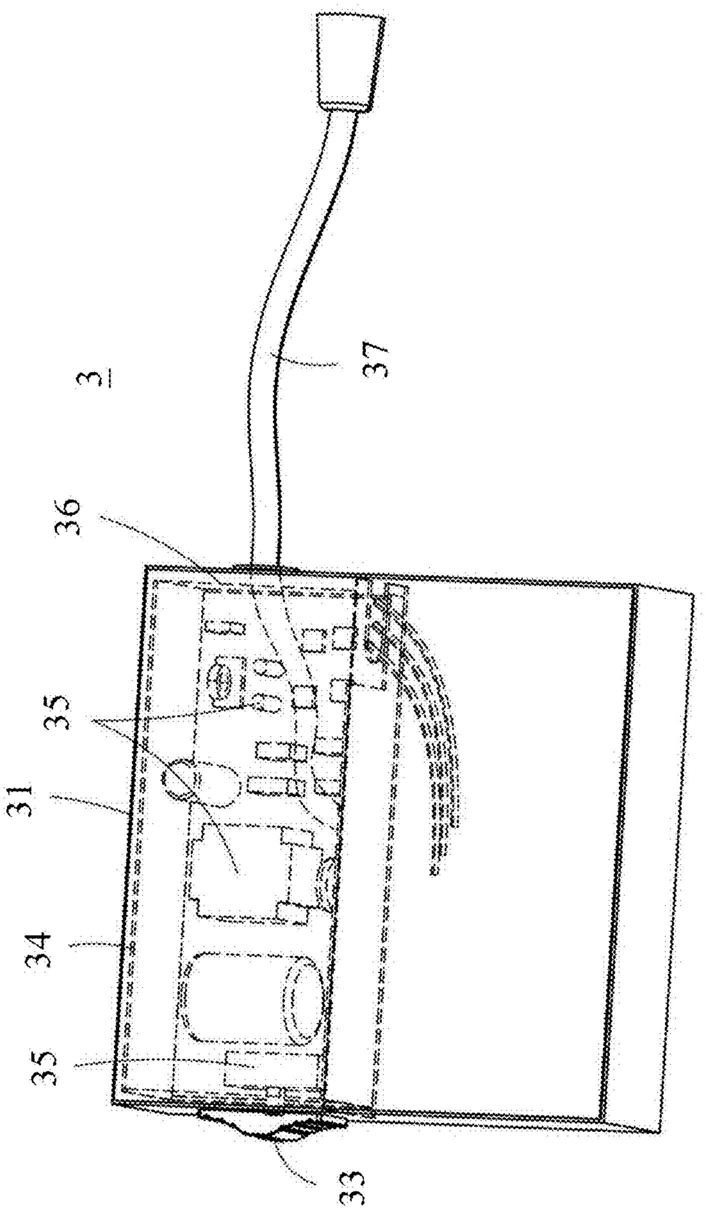
FIG. 14 is a schematic view of a power box element of the downlight with multi-mode switching function in accordance with yet another embodiment of the present invention.
Figure 15:
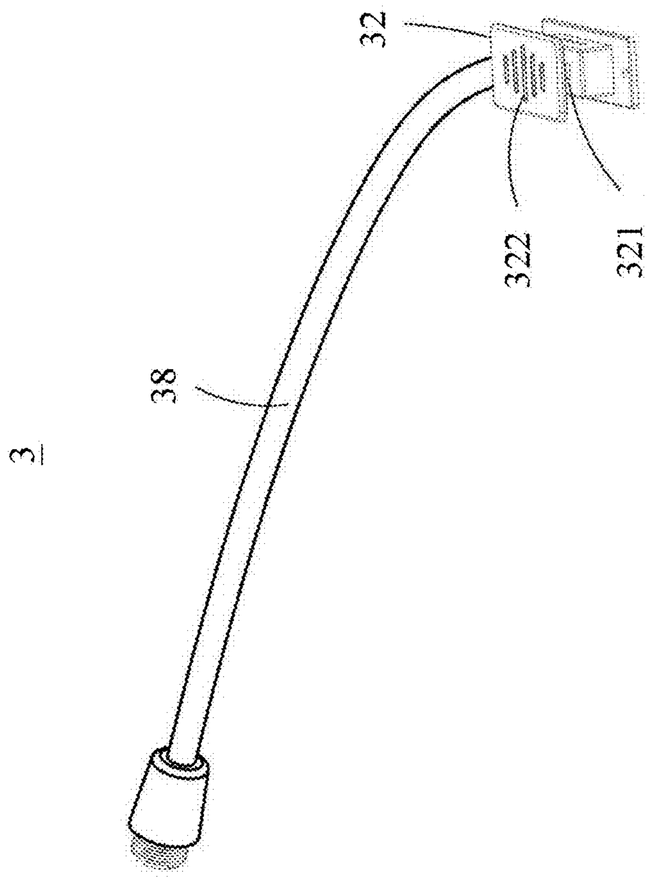
FIG. 15 is a schematic view of a dip switch element of the downlight with multi-mode switching function in accordance with yet another embodiment of the present invention.

Please refer to FIG. 8, FIG. 13, FIG. 14 and FIG. 15. FIG. 14 is a schematic view of a power box element of the downlight with multi-mode switching function in accordance with yet another embodiment of the present invention. FIG. 15 is a schematic view of a dip switch element of the downlight with multi-mode switching function in accordance with yet another embodiment of the present invention. In some embodiments, the external of the power box element 31 includes a gear switch 33, and the internal includes a plastic box 34, a driver element 35 inside the plastic box 34, and a metal cover 36 covering the plastic box 34. The gear switch 33 is connected to the driver element 35, and the power box element 31 also includes a female terminal power cable 37 connected to the driver element 35. The power can be adjusted via the gear switch 33, the driver element 35 is protected by the metal cover 36, and the design of the power box element 31 facilitates wiring.

The embodiment just exemplifies the present invention and is not intended to limit the scope of the present invention; any equivalent modification and variation according to the spirit of the present invention is to be also included within the scope of the following claims and their equivalents.

Please refer to FIG. 8 and FIG. 15. In some embodiments, the dip switch element 32 includes a dip switch device 321 combined within the protection body 212 and a dip switch 322 disposed on the dip switch device 321, which is disposed outside the protection body 212. The dip switch device 321 is fixed to the protection body 212 using self-tapping screws. The color temperature can be adjusted via the dip switch 322.

The embodiment just exemplifies the present invention and is not intended to limit the scope of the present invention; any equivalent modification and variation according to the spirit of the present invention is to be also included within the scope of the following claims and their equivalents.

Please refer to FIG. 8 and FIG. 15. In some embodiments, the power box element 31 further includes a male terminal power cable 38 used to connect to the female terminal power cable 37, where the male terminal power cable 38 connects the lighting-emitting element 22 to the dip switch device 321, which is connected to the lighting-emitting element 22. Specifically, the dip switch device 321 is connected to the lighting-emitting element 22 (as shown in FIG. 12) for adjusting the color temperature.

The embodiment just exemplifies the present invention and is not intended to limit the scope of the present invention; any equivalent modification and variation according to the spirit of the present invention is to be also included within the scope of the following claims and their equivalents.

Figure 16:
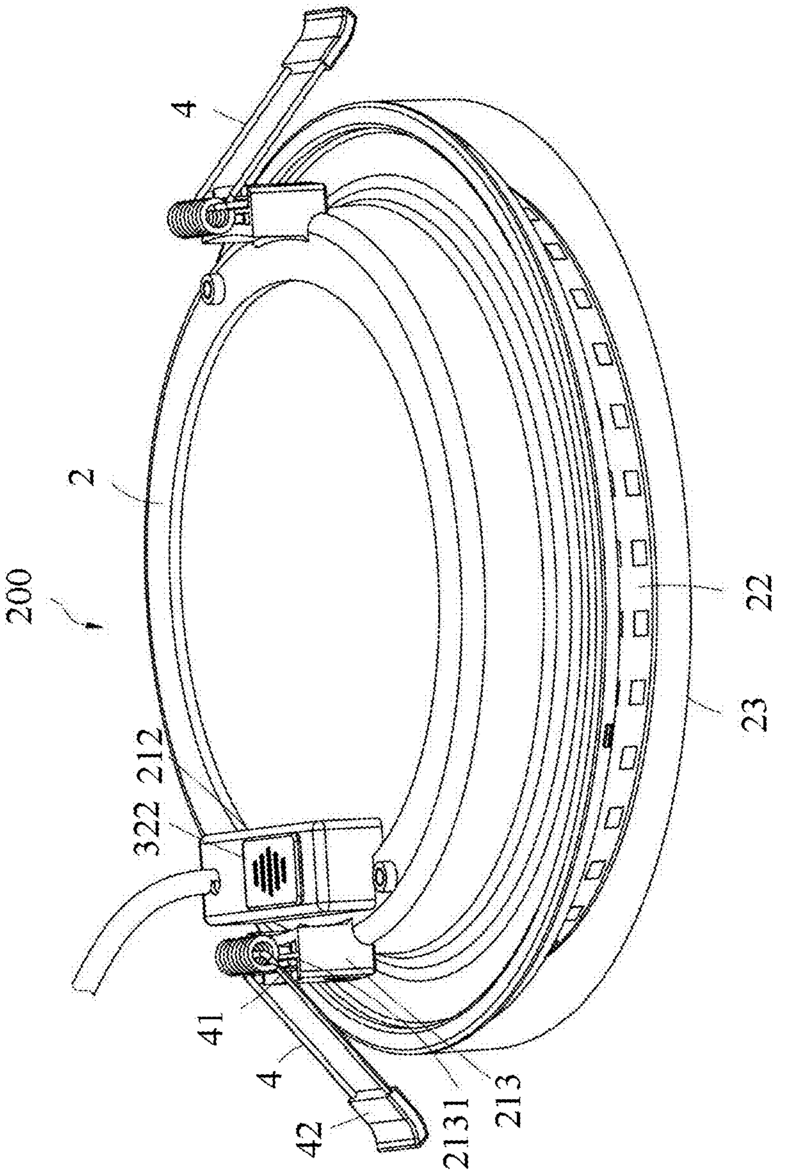
FIG. 16 is another schematic view of the housing of the downlight with multi-mode switching function in accordance with yet another embodiment of the present invention.

Please refer to FIG. 8 and FIG. 16. FIG. 16 is another schematic view of the housing of the downlight with multi-mode switching function in accordance with yet another embodiment of the present invention. In some embodiments, the two ends of each spring buckle element 4 are provided with a support portion 41 and a clamping portion 42 respectively. The support portions 41 are respectively combined with the fixing portions 213. In some embodiments, each fixing portion 213 has an installation hole 2131, and each support portion 41 is directly press-fitted into each installation hole 2131. When the spring buckle elements 4 are installed on the fixing portions 213 of the housing 2, the support portions 41 of the spring buckle elements 4 are directly press-fitted onto the fixing portions 213, forming fixed support points against the side wall of the housing 2, thereby providing a fixing and clamping effect, securely fixing the downlight 200 to the wall. The spring buckle elements 4 are directly press-fitted onto the fixing portions 213 for easy installation, reducing installation time, and saving manpower cost.

The embodiment just exemplifies the present invention and is not intended to limit the scope of the present invention; any equivalent modification and variation according to the spirit of the present invention is to be also included within the scope of the following claims and their equivalents.

Figure 17:
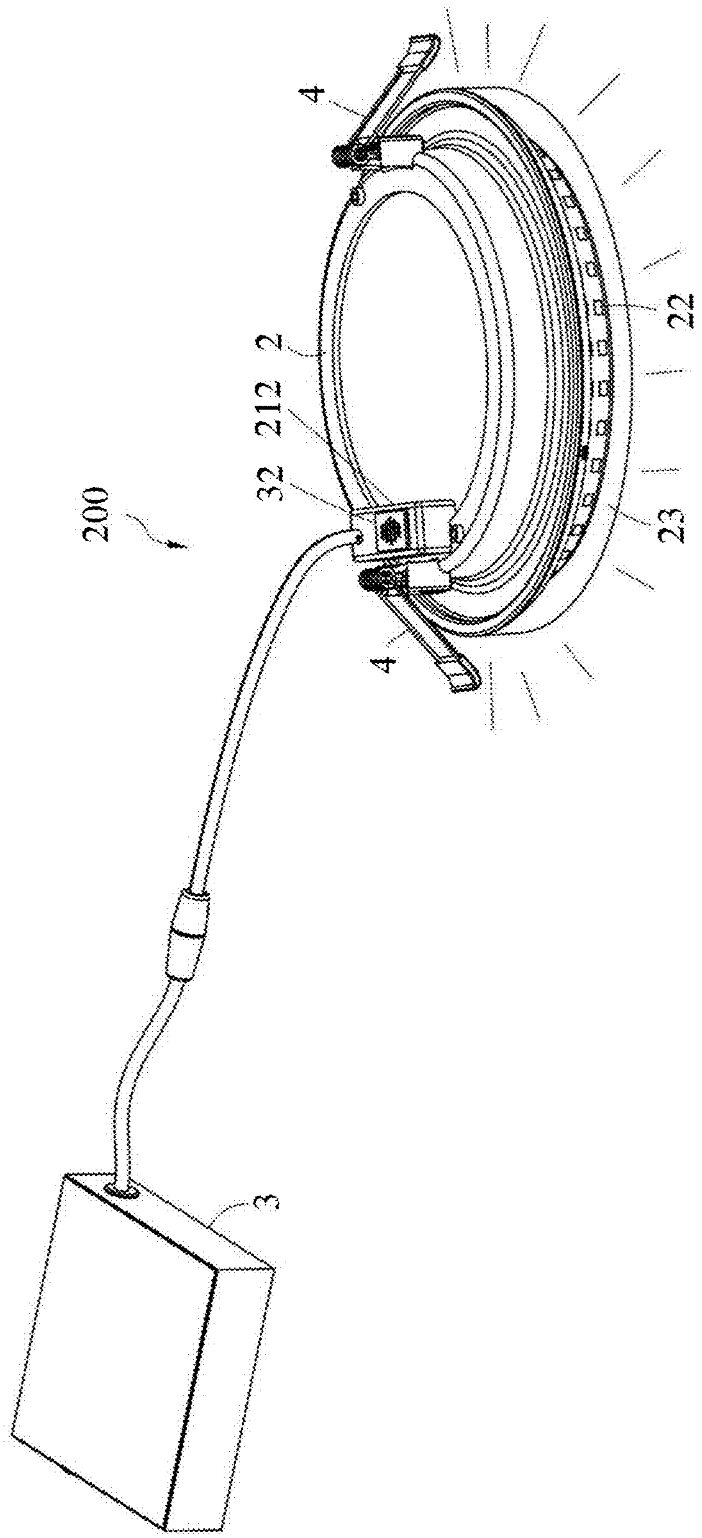
FIG. 17 is a schematic view of a usage status of the downlight with multi-mode switching function in accordance with yet another embodiment of the present invention.

Please refer to FIG. 8, FIG. 12, and FIG. 17. FIG. 17 is a schematic view of a usage status of the downlight with multi-mode switching function in accordance with yet another embodiment of the present invention. In some embodiments, before installing the downlight 200, the user can adjust the color temperature and power according to actual needs; subsequently, if the user would like to adjust them, the user can remove the downlight 200 for reconfiguration. After installation, the user can control the downlight 200 via a switch on the wall to meet their direct or ambient lighting needs, or both simultaneously. For high illumination, both the vertical-type light source element 221 and the side-type light source element 222 can be activated to illuminate all around. For medium illumination, only the vertical-type light source element 221 is activated to mainly illuminate below the ceiling. For low illumination, only the side-type light source element 222 is activated to emit light around, evenly illuminating the ceiling, creating a halo effect. Additionally, it can serve as a nightlight, providing gentle illumination for individuals using the restroom at night.

The structure of the downlight with multi-mode switching function according to the embodiments described above realizes the function of switching color temperature and power. Moreover, the downlight with multiple angles of illumination can also switch the direction and light pattern, thereby being suitable for various applications. Particularly, adjustable color temperature and power facilitate user customization; multi-angle illumination meets diverse usage scenarios; the internal light source can emit light independently as the main lighting, while the external light source can emit light independently as auxiliary lighting such as night lights; both internal and external sources light can be simultaneously activated for mixed-color lighting, enhancing the aesthetic appeal of the illumination.

The embodiment just exemplifies the present invention and is not intended to limit the scope of the present invention; any equivalent modification and variation according to the spirit of the present invention is to be also included within the scope of the following claims and their equivalents.

As mentioned above, the present invention provides a downlight 200 with multi-mode switching function, which includes a housing 2, a lighting-emitting element 22, a lampshade 23, a driver element 3, and a plurality of spring buckle elements 4. The housing 2 has a cylindrical body 21, an opening 211, a protection body 212, and a plurality of fixing portions 213, with the opening 211 disposed at one end of the cylindrical body 21, and the protection body 212 and fixing portions 213 disposed on the outer wall of the cylindrical body 21. The lighting-emitting element 22 is combined with the cylindrical body 21. The lampshade 23 is combined with the cylindrical body 21 and covers the opening 211. The driver element 3 includes a power box element 31 and a dip switch element 32 connected to the power box element 31, with the dip switch element 32 disposed within the protection body 212 and connected to the lighting-emitting element 22. Each spring buckle element 4 has a support portion 41 and a clamping portion 42 at the two ends thereof. The support portions 41 are combined with the fixing portions 213 respectively.

In one embodiment, each fixing portion 213 has an installation hole 2131, and each support portion 41 is directly press-fitted into each installation hole 2131.

In one embodiment, the housing 2 has a plurality of locking holes 25, with the lighting-emitting element 22 disposed inside the cylindrical body 21 and locked to each locking hole 25 by the locking elements 9.

In one embodiment, the side wall 216 of the lampshade 23 has a plurality of stepped patterns 231.

In one embodiment, the side wall 216 of the lampshade 23 has a plurality of buckle portions 236, and the housing 2 has a plurality of buckle parts 26, with each buckle portion 236 respectively engaged with each buckle part 26.

In one embodiment, the cylindrical body 21 includes a top wall 215 and a side wall 216, with the lighting-emitting element 22 including a vertical-type light source element 221 combined with the top wall 215 and a side-type light source element 222 combined with the side wall 216.

In one embodiment, the cylindrical body 21 includes a rib channel 217 disposed on the side wall 216, with the lighting-emitting element 22 including an electrical wire 223, which is disposed in the rib channel 217 and connected to the vertical-type light source element 221 and the side-type light source element 222.

In one embodiment, the exterior of the power box element 31 includes a gear switch 33, while the interior includes a plastic box 34, a driver element 35 disposed within the plastic box 34, and a metal cover 36 covering the plastic box 34, with the gear switch 33 connected to the driver element 35, and the power box element 31 further includes a female terminal power cable 37 connected to the driver element 35.

In one embodiment, the dip switch element 32 includes a dip switch device 321 combined with the protection body 212 and a dip switch 322 disposed within the dip switch device 321, where the dip switch 322 is disposed outside the protection body 212.

In one embodiment, the power box element 31 additionally includes a male terminal power cable 38 connecting to the female terminal power cable 37, where the male terminal power cable 38 connects the lighting-emitting element 22 to the dip switch device 321, which is connected to the lighting-emitting element 22.

The embodiment just exemplifies the present invention and is not intended to limit the scope of the present invention; any equivalent modification and variation according to the spirit of the present invention is to be also included within the scope of the following claims and their equivalents.

To sum up, according to one embodiment of the present invention, the downlight includes a lamp body and a light source board. The lamp body has a central hole, an inner ring body, and a plurality of protrusions. The inner ring body is disposed on the inner edge of the lamp body to partially cover the central hole. The protrusions are distributed along the inner edge of the lamp body and surrounding the central hole. A plurality of slots are formed respectively between the protrusions and the inner ring body. The light source board is disposed on the inner ring body and within the central hole, and engaged with the multiple slots. The light source board is disc-shaped. Via this screw-free fixation structural design, the downlight can securely fasten the light source board via a screw-free fixation mechanism, thereby reducing time and manpower costs in the production process and minimizing the risk of human error. Moreover, this screw-free fixation structural design eliminates the need for additional fixing components, thus reducing material costs. Consequently, the production cost of the downlight can be significantly reduced, and production efficiency enhanced.

According to one embodiment of the present invention, the light source board has a plurality of fixing holes, while one side of the light source board corresponding to the light source board is provided with a plurality of locking points. The locking points are inserted into the fixing holes. Via the slots, fixing holes, and locking points, a multifunctional fixing effect can be achieved, which not only achieves a snap-fit effect but also a press-fit effect.

Therefore, this screw-free fixation structural design with multifunctional fixation effect can stabilize the light source board more effectively, enhancing the overall structural stability of the downlight.

According to one embodiment of the present invention, the downlight further includes a switch module and a control box. The switch module is disposed inside the control box, and the control box does not face the light-emitting surface of the light source board. Therefore, the control box and switch module do not affect the light-emitting effect of the light source board, and the user can conveniently operate the switch module to turn the downlight on or off, or adjust the brightness or color temperature thereof. As a result, the light emitting effect of the downlight can be effectively enhanced, and the downlight can be more convenient in use so as to provide the user with a great user experience.

Further, according to one embodiment of the present invention, the light source board is disposed on the inner ring body within the central hole, with the inner ring body partially covering the light source board. Thus, one side of the light source board can partially protrude from the inner ring body, allowing the light source board to dissipate heat through the structure mentioned above, preventing damage due to overheating. This special heat dissipation structure design can effectively extend the service life of the downlight and enhance the reliability thereof.

Moreover, according to one embodiment of the present invention, the ultra-thin structural design of the downlight significantly reduces the thickness thereof, so it is convenient to install the downlight. Thus, the user can more easily install the downlight on various types of ceilings or walls, suitable for various buildings. At the same time, this structural design provides more possibilities for interior design to optimize the overall lighting effect. Therefore, the practicality of the downlight can be greatly enhanced.

Furthermore, according to one embodiment of the present invention, the downlight with multi-mode switching function, enabling the switching of color temperature and power in multiple modes. Moreover, a downlight emitting light from multiple angles simultaneously can switch the direction of illumination and light pattern, thus being applicable in various scenarios. Particularly, adjustable color temperature and power facilitate the user customization according to their needs; multi-angle lighting meets various scenarios; the inner light source can emit light independently as main illumination, while the outer light source can serve as a night light or auxiliary illumination; simultaneous illumination of inner and outer light sources allows for color mixing, enhancing the aesthetic appeal of the emitted light.

It will be apparent to those skilled in the art that various modifications and variations can be made to the disclosed embodiments. It is intended that the specification and examples be considered as exemplary only, with a true scope of the present invention being indicated by the following claims and their equivalents.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A downlight with screw-free fixation structure, comprising:

a lamp body having a central hole, an inner ring body, and a plurality of protrusions, wherein the inner ring body is disposed on an inner edge of the lamp body to partially cover the central hole, the protrusions are distributed along the inner edge of the lamp body and surrounding the central hole, and a plurality of slots are formed respectively between the protrusions and the inner ring body; and a light source board disposed on the inner ring body and within the central hole, and engaged with the multiple slots, wherein the light source board is disc-shaped.

2. The downlight with screw-free fixation structure as claimed in claim 1, wherein the light source board has a plurality of straight sides.

3. The downlight with screw-free fixation structure as claimed in claim 2, wherein a number of straight sides is greater than a number of slots.

4. The downlight with screw-free fixation structure as claimed in claim 2, wherein a number of straight edges is equal to a number of slots.

5. The downlight with screw-free fixation structure as claimed in claim 1, wherein the light source board has a plurality of fixing holes, and one side of the inner ring body is provided with a plurality of locking points corresponding to one side of the light source board, and the locking points are inserted into the fixing holes.

6. The downlight with screw-free fixation structure as claimed in claim 5, wherein a number of fixing holes is greater than a number of locking points.

7. The downlight with screw-free fixation structure as claimed in claim 5, wherein a number of fixing holes is equal to a number of locking points.

8. The downlight with screw-free fixation structure as claimed in claim 5, wherein the light source board has a plurality of straight sides, and a number of the straight sides is greater than a number of the fixing holes.

9. The downlight with screw-free fixation structure as claimed in claim 1, wherein the inner ring body partially covers the light source board.

10. The downlight with screw-free fixation structure as claimed in claim 9, wherein one side of the light source board partially protrudes from the inner ring body.

11. The downlight with screw-free fixation structure as claimed in claim 1, further comprising a control box disposed on one side of the lamp body.

12. The downlight with screw-free fixation structure as claimed in claim 11, further comprising a switch module disposed inside the control box and electrically connected to the light source board.

13. The downlight with screw-free fixation structure as claimed in claim 11, wherein a shortest distance from the control box to a central axis of the central hole is greater than half a radius of the central hole.

14. The downlight with screw-free fixation structure as claimed in claim 13, wherein a vacant space is formed on one side of the control box.

15. The downlight with screw-free fixation structure as claimed in claim 11, further comprising a power cable, wherein the control box is electrically connected to an external power via the power cable.

16. The downlight with screw-free fixation structure as claimed in claim 15, wherein the external power source is a utility power or a generator.

17. The downlight with screw-free fixation structure as claimed in claim 1, further comprising a light cover disposed on another side of the lamp body to cover the central hole and another side of the light source board.

* * * * *